United States Patent [19]

Morkel

[11] Patent Number: 5,410,624
[45] Date of Patent: Apr. 25, 1995

[54] FILTER FOR A WAVELENGTH DIVISION MULTIPLEX SYSTEM

[75] Inventor: Paul R. Morkel, London, United Kingdom

[73] Assignee: Northern Telecom Limited, Montreal, Canada

[21] Appl. No.: 265,689

[22] Filed: Jun. 24, 1994

[30] Foreign Application Priority Data

Sep. 1, 1993 [GB] United Kingdom ............... 9318108

[51] Int. Cl.⁶ .................................................. H01S 3/30
[52] U.S. Cl. .................................................. 385/24; 372/6
[58] Field of Search .................. 385/11, 24, 37, 28, 385/27; 372/6

[56] References Cited

U.S. PATENT DOCUMENTS

| | | | |
|---|---|---|---|
| 5,172,258 | 12/1992 | Verber | 385/132 |
| 5,187,760 | 2/1993 | Huber | 372/6 |
| 5,200,964 | 4/1993 | Huber | 385/11 |
| 5,243,609 | 9/1993 | Huber | 372/6 |
| 5,295,209 | 3/1994 | Huber | 385/37 |

*Primary Examiner*—Akm E. Ullah
*Attorney, Agent, or Firm*—Lee, Mann, Smith, McWilliams, Sweeney & Ohlson

[57] ABSTRACT

An arrangement for reducing the effects of four-wave-mixing in an optically amplified WDM optical fiber communication system employing dissimilar wavelength channel spacing, comprising means for effecting spectral regeneration of the optical signals at intervals along the system transmission medium.

2 Claims, 1 Drawing Sheet

FILTER FOR A WAVELENGTH DIVISION MULTIPLEX SYSTEM

FIELD OF THE INVENTION

This invention relates to an optically amplified wavelength division multiplex (WDM) optical communication system.

Wavelength division multiplexing (WDM) in optically amplified communication systems is a means for achieving increased information capacity by combining a number of channels in parallel in the same fiber. It offers the following advantages.

1. High information capacities can be achieved in a single fiber by combining a number of lower bit-rate channels. This means that the requirement for high bit-rate transmitters, receivers and electronics is reduced.

2. Optical amplifiers based on erbium-doped fibers can readily amplify a number of wavelength channels simultaneously without contributing any significant cross-talk between the channels. This compares with semiconductor optical amplifiers (SLAs) which will in general contribute inter-channel cross-talk.

3. Operating a high capacity link with WDM rather than time-division-multiplexing (TDM) has the advantage of showing reduced sensitivity to dispersive effects such as chromatic dispersion and polarisation mode-dispersion. This may make WDM the preferred approach for systems operating at >10 Gbit/s (total capacity) over transmission distances >1000 km.

Two major effects are likely to limit the application of WDM in future communications systems.

a) Spectral gain flatness

In order to transmit a number of channels the system gain should be the same for each of the channels to allow the same received signal power in each channel. In general this will not be the case due to the natural spectral gain profile of the erbium ions which is not uniform. However, novel techniques can be used to produce a flat gain spectrum as disclosed in our co-pending application No.

b) Four wave mixing

Four wave mixing can cause cross-talk between channels and excess attenuation or power loss. The effect of four-wave mixing can be reduced by operating at wavelengths away from the chromatic dispersion minimum of the fiber and by having large (>1 nm) and uneven wavelength spacings between channels. There is a strong requirement however to maximise the signal input power into an amplified system in order to maximise the signal to noise ratio at the receiver end. Under these conditions there is always likely to be a degree of four-wave mixing and there is therefore a strong motivation to reduce its effects.

In the presence of four-wave-mixing two major effects occur.

a) If there are more than two wavelength channels then for particular wavelength separations the four-wave-mixing components can sit exactly on top of another channel. This causes cross-talk whereby the data in one channel is corrupted by data from another channel and is highly undesirable. The total number of new components that can be produced is given by $N^2(N-1)/2$ where N is the total number of wavelength channels. For N=3 this gives 9 components and for N=4 this gives 24 components. It is well appreciated that operating with dissimilar wavelength channel spacings reduces the effect of cross-talk. However, in long haul systems four-wave-mixing is likely to build up such that the four-wave-mixing components themselves mix with the signal channels to produce new four-wave-mixing components. Under these conditions it will be almost impossible to prevent cross-talk and in this case it is highly desirable to remove the four-wave-mixing components.

b) Generation of four-wave-mixing components also causes loss of energy from the signal channels and this extra attenuation is undesirable. However, in modern optical amplified systems this disadvantage is not generally considered to be limiting as the amplifiers can overcome this additional loss.

It is well appreciated that four-wave-mixing in WDM fiber systems can be reduced by operating significantly away from the wavelength of zero dispersion in the fiber. This arises by virtue of the fact that the generation of four-wave-mixing components depends on a phase matching process between different wavelength channels, and in a wavelength region where there is substantial dispersion, the length scale over which phase matching can take place is greatly reduced. It will be possible therefore to operate in a wavelength region where there is significant chromatic dispersion to minimise four-wave-mixing. This will mean, in general, operating more than 10–15 nm away from the wavelength of zero dispersion. This also implies the use of lengths of dispersion compensating fiber to arrive back at a net zero or close to zero dispersion condition for the overall link to minimise pulse broadening.

A technique has been disclosed by K Inoue, "Reduction of fiber four-wave-mixing influence using frequency modulation in multichannel IM/DD transmission", IEEE Photonics tech. Letters, Vol. 4, No. 11, November, 1992 for reduction of four-wave-mixing induced cross-talk based on adding frequency modulation to the wavelength channels in addition to the amplitude modulation. The purpose of the frequency modulation is to broaden the spectral bandwidth of the four-wave-mixing components. The baseband electrical filter in the receiver thus is able to filter out a large part of the four-wave-mixing induced cross-talk which now has higher frequency components.

This technique however requires extra bandwidth for each channel.

Moreover, increasing the spectral width of the channels by frequency modulation creates increased sensitivity to chromatic dispersion effects which will be disadvantageous for long-haul systems. An additional active modulator is required at the transmitter. Also the effect of substantial fiber dispersion in long haul systems will be to cause frequency to amplitude conversion effects which will degrade the bit rate error.

It is also known from European patent application No. 0 242 802 A2 to use spectral filtering to remove optical noise from amplifiers in the spectral regions between the WDM channels.

SUMMARY OF THE INVENTION

According to the present invention there is provided a method of reducing the effects of four-wave mixing in an optically amplified wavelength division multiplex (WDM) optical communications system employing dissimilar wavelength channel spacing, the method comprising the steps of:

coupling a wavelength division multiplex signal at an input port of an optical circulator, said optical circulator also having an intermediate port and an output port whereof the input and output ports are connected in and form part of the optical communication system, passing a signal output from the intermediate port of the circulator through a set of concatenated narrowband fiber gratings, wherein each fiber grating is tuned to an individual one of the wavelength division multiplexed optical frequencies, coupling the signals reflected from said set of concatenated narrowband reflective fiber gratings at the intermediate port of the circulator whereby only the wavelength division multiplexed optical frequencies are output from the output port of the circulator.

The invention also provides an arrangement for reducing the effects of four-wave-mixing in an optically amplified WDM optical fiber communication system employing dissimilar wavelength channel spacing, the arrangement comprising an optical circulator means having an input port, an output port and an intermediate port, whereof the input and output ports are connected in and form part of the optical communication system, and a concatenation of narrow band reflection fiber gratings each tuned to an individual one of the multiplexed wavelengths, said concatenation being connected to the intermediate port of the optical circulator means whereby the WDM optical signals propagated in the system, including four-wave-mixing products of said signals, received at the input port of the optical circulator means are passed to the concatenation of fiber gratings and spectrally filtered optical signals reflected by the concatenated fiber gratings are passed to the output port of the circulator.

BRIEF DESCRIPTION OF THE DRAWINGS

Embodiments of the invention will now be described with reference to the accompanying drawings, in which.

DESCRIPTION OF THE PREFERRED EMBODIMENT

The invention is applicable to the transmission of WDM optical signals in fiber systems in excess of 1000 km where the WDM channels have dissimilar wavelength spacing.

Figure 1:
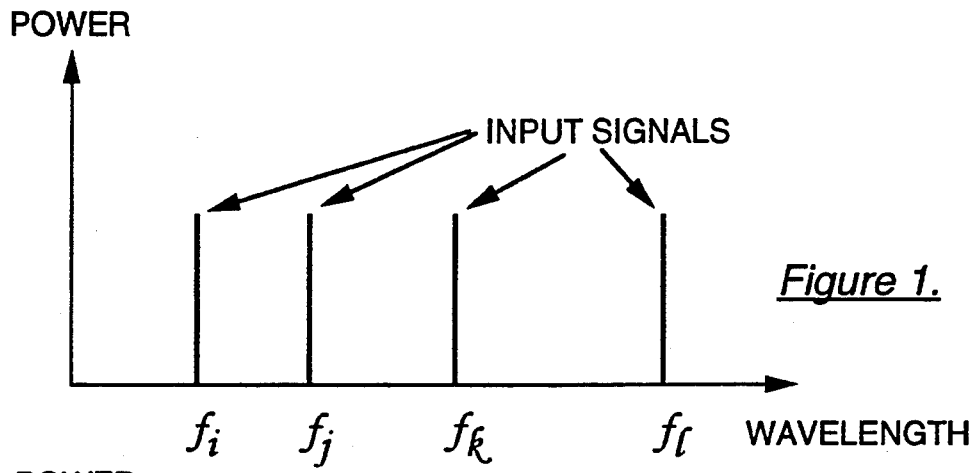
FIG. 1 is a graphical illustration of a number of WDM signals in an optical communication system.
Figure 2:
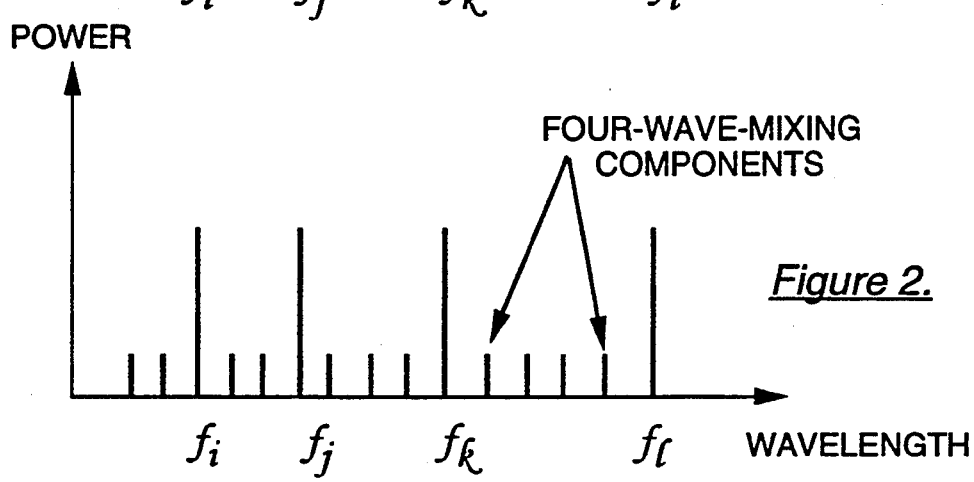
FIG. 2 is a graphical illustration of the effects of four-wave-mixing between the signals of FIG. 1.

FIG. 1 shows a typical input spectrum to a long haul (>1000 km) optically amplified WDM system. Four channels are indicated as an example. The wavelength separation of the channels $f_i$–$f_e$ is carefully chosen such that the four-wave-mixing components, which are produced at frequencies $f_i+f_j-f_k$ or $2f_i-f_k$ where i, j and k represent different channels, do not occur at the same frequency as any of the channels. After propagation through a length of fiber an optical spectrum similar to that given in FIG. 2 may be obtained. FIG. 2 shows the generation of the four-wave-mixing components. In order to prevent second order four-wave-mixing which will in general induce cross-talk, the optical spectrum is regenerated to that of the original by spectral filtering. The point at which it is necessary to do this is likely to be when the four-wave-mixing components are in the range −20 to −10 dB of the signal channels. This will probably correspond to propagation through 500–1500 km of fiber depending on the signal power level. The spectrally regenerated signal is then propagated through a further length of fiber before being regenerated again and so on.

Figure 3:
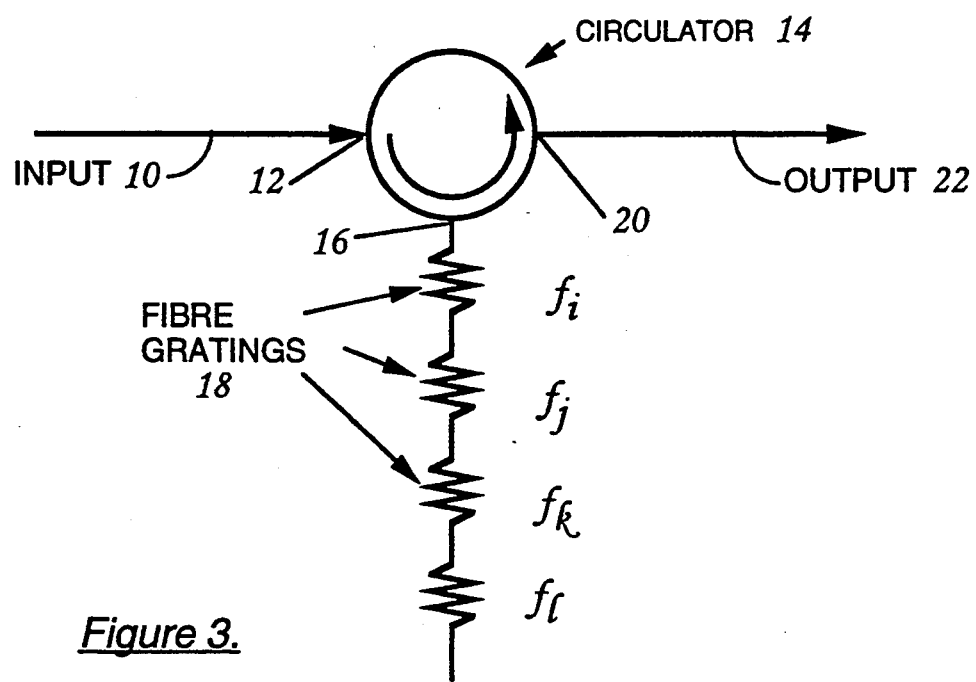
FIG. 3 illustrates an arrangement for spectral regeneration of the WDM optical signals represented in FIGS. 1 and 2.

Spectral regeneration is conveniently effected by the arrangement shown in FIG. 3. An input optical fiber 10 carrying the WDM channels is coupled to the input port 12 of an optical circulator 14. The intermediate port 16 of the circulator 14 is coupled to a set of concatenated narrow band reflective fiber gratings 18, each tuned to an individual one of the optical frequencies $f_i$–$f_e$. The output port 20 is coupled to output fiber 22. The arrangement is such that a fiber grating tuned to optical frequency $f_i$ will reflect only that frequency allowing all other frequencies, whether they be the other WDM frequencies $f_i$–$f_e$ or the four-wave-mixing products, to pass through. The other gratings act in like manner at their allotted frequencies. Thus the only signals returned from the gratings are the spectrally pure WDM frequencies, all the four-wave-mixing products passing through the gratings to be lost. Fiber gratings are capable of giving very narrow reflection characteristics (<0.1 nm) and the wavelength can be accurately specified in fabrication. Various configurations are known for optical circulators, that shown in U.S. Pat. No. 5,204,771 being one such device. A form of optical circulator may also be constructed in an all fiber structure based on the well known fused fiber coupler.

The technique of this invention can be used in conjunction with operation in a wavelength region of substantial chromatic dispersion in order to minimise the build up of four-wave-mixing components.

I claim:

1. An arrangement for reducing the effects of four-wave-mixing in an optically amplified WDM optical fiber communication system employing dissimilar wavelength channel spacing, the arrangement comprising an optical circulator means having an input port, an output port and an intermediate port, whereof the input and output ports are connected in and form part of the optical communication system, and a concatenation of narrow band reflection fiber gratings each tuned to an individual one of the multiplexed wavelengths, said concatenation being connected to the intermediate port of the optical circulator means whereby the WDM optical signals propagated in the system, including four-wave-mixing products of said signals, received at the input port of the optical circulator means are passed to the concatenation of fiber gratings and spectrally filtered optical signals reflected by the concatenated fiber gratings are passed to the output port of the circulator.

2. A method of reducing the effects of four-wave-mixing in an optically amplified wavelength division multiplex (WDM) optical communication system employing a dissimilar wavelength channel spacing, the method comprising the steps of:

coupling a wavelength division multiplex signal at an input port of an optical circulator, said optical circulator also having an intermediate port and an output port, whereof the input and output ports are connected in and form part of the optical communication system, passing a signal output from the intermediate port of the circulator through a set of concatenated narrowband fiber gratings, wherein each fiber grating is tuned to an individual one of the wavelength division multiplexed optical frequencies, coupling the signals reflected from said set of concatenated narrowband reflective fiber gratings at the intermediate port of the circulator whereby only the wavelength division multiplexed optical frequencies are output from the output port of the circulator.

* * * * *